2,832,755
Patented Apr. 29, 1958

2,832,755

MONOMERIC POLYMERIZABLE UREIDO AND THIOUREIDO COMPOUNDS, METHODS FOR PRODUCING THEM AND POLYMERS THEREOF

Sidney Melamed, Philadelphia, Pa., assignor to Rohm & Haas Company, Philadelphia, Pa., a corporation of Delaware No Drawing. Application April 15, 1955
Serial No. 501,708

19 Claims. (Cl. 260—77.5)

The present invention relates to new ureido and thioureido compounds which contain a position of monoethylenic unsaturation adapting them to be polymerized by addition polymerization procedures and which also contain alkylated methylol groups adapting them and their polymers to be converted into insoluble, infusible materials, such as by the application of heat, preferably in the presence of an acid catalyst. The present invention also relates to a distinctive method for producing the new monomeric compounds. It also concerns the new polymers including homopolymers and copolymers that may be obtained by the addition polymerization of the new monomers.

It is a primary object of the present invention to provide a novel and improved group of compounds of monomeric character which include within their structure monoethylenic unsaturation adapting them to be polymerized by simple addition polymerization to fusible or soluble types of linear polymers, and which also include within their structure alkylated methylol groups adapting the monomers as well as the addition polymers obtained therefrom to be rendered insoluble and/or infusible by simple condensation reactions on heating, preferably in the presence of an acid catalyst. Another object of the invention is to provide a novel method for producing the polymerizable compounds of the type described. The advantages of the monomeric and polymeric products as well as of the new method will appear in the following description thereof.

The new compounds of monomeric character provided by the present invention are those having the structure of Formula I following:

(I)
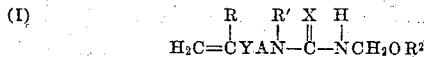

in which R is H or CH₃, Y is O, S, or

A is phenylene or alkylene having 2 to 4 carbon atoms of which a chain of at least two extend between the adjoined atoms of Y and N, R' is H or an alkyl group having 1 to 12 carbon atoms, with the proviso that when Y is —COO—, R' is an alkyl group of at least 4 carbon atoms containing a tertiary carbon atom attached to the adjoining N atom, X is O or S, and R² is a lower alkyl group having 1 to 4 carbon atoms.

It is to be noted that these compounds contain a point of unsaturation and are vinyl ethers, vinyl sulfides or esters of acrylic or methacrylic acid joined through an alkylene or phenylene group to a ureido or thioureido group which also contains an alkylated methylol group designated —CH₂OR². All of the compounds within the scope of Formula I, therefore, include the monoethylenic unsaturation and the alkylated methylol group rendering the compounds capable of addition polymerization through the former group and/or condensation polymerization through the latter group.

In accordance with the present invention, the compounds of Formula I are produced by the reaction of a compound of Formula II following with a compound of Formula III following:

(II)

(III)

in which the symbols have the same definition as above. The latter compound is an alkoxymethyl isocyanate or an alkoxymethyl isothiocyanate. The reaction between Compounds II and III may be effected in bulk or in solution in an inert organic solvent, such as ether, benzene, acetonitrile, dioxane, or t-butanol. The temperature reaction may be from about 0° and 50° C. and is preferably effected with cooling at temperatures between 0° and 20° C. Because of the exothermic nature of the reaction, it is generally desirable to gradually add one of the reactants to the other to facilitate control of the temperature. For example, the unsaturated amine of Formula II may be added to the compound of Formula III.

All of these starting reactants are known except the sulfides of Formula II which can be produced by the reaction of acetylene with aminoalkyl mercaptans in the same manner as the corresponding vinyl ethers are produced by reacting acetylene with aminoalkyl alcohols. Thus, they may be produced by reacting the mercaptans and the acetylene at temperatures of 125° C. to 150° C. at pressures on the order of 200 pounds per square inch in the presence of an alkaline catalyst, such as an alkali metal hydroxide, for example KOH and NaOH.

The isocyanate and thioisocyanate of Formula III may be produced directly from aliphatic compounds containing a chloromethoxy group (—OCH₂Cl), such as chloromethoxy methane, chloromethoxy ethane, chloromethoxy propane, chloromethoxy butane, and so on by reacting such chloromethoxy compounds with silver cyanates or alkali metal thiocyanates, such as ammonium, potassium or sodium thiocyanate, at low temperatures of about room temperature up to about 60° C. Reaction may be performed in an anhydrous medium for a period of several hours, such as from 3 to 48 hours. At the conclusion, the solvent contains the isocyanate or isothiocyanate in solution. The salt may simply be filtered off and the solvent stripped off by distillation to leave the desired product of Formula III.

The new compounds of Formula I cannot be made practically by producing monomers of Formula IV:

(IV)
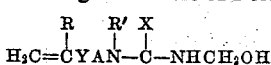

and then reacting them with acid and an alcohol, such as methanol. The introduction of the radical R² of the alcohol R²OH requires reaction on the acid side and the methylolated vinyl ethers and vinyl sulfides of Formula IV hydrolyze under acid conditions at a rate which is practically as fast or faster than the reaction with the alcohol. In addition, a sulfur atom of the thioureido group is subject to alkylation at approximately the same or faster rate than the nitrogen atoms. In the case of the esters, the initial reaction with formaldehyde to produce methylolated compounds of the esters having the structure of Formula IV requires reaction on the basic side, and under these conditions the ester linkage is partially saponified, resulting in lower yields and in products contaminated with hydrolysis products and by-products of side reactions such as addition reactions.

The thioureas and ureas of Formula I include many which are liquids and some which are of solid character at normal room temperatures. The ureas are generally somewhat more stable than the thioureas under normal temperatures and humidities of storage but the thioureas are adequately stable for many purposes and uses pointed out hereinbelow. The vinyl ethers within the scope of Formula I are sensitive to acid, being rapidly hydrolyzed in the presence of acid. They are also characterized by good polymerizability by the addition system. In the presence of an acid catalyst, such as boron trifluoride and mercury salts, the vinyl ethers add alcohols and mercaptans in the alpha position. In contrast with the vinyl ethers, the vinyl sulfides, while still characterized by moderate capacities or rates of polymerization by the addition system, are only slowly hydrolyzed in the presence of dilute acid. Furthermore, the reactive nature toward such compounds as mercaptans and amines is quite different from the reactivity of the vinyl ethers. Thus, the vinyl sulfides add mercaptans in the beta position. The esters on the other hand are also distinctive in their reactive character in that the compounds are not acid sensitive, polymerizability by the addition system is good, and amines, alcohols, mercaptans, and active methylene compounds, such as acetoacetic esters, add readily in the beta position on the basic side or in the presence of a basic catalyst, such as sodium methoxide. Thus, three separate groups of material are defined having in common a vinyl group and an alkoxymethyl group, but each being distinct as regards the vinyl group in reactivity, stability, and utility.

The compounds of the present invention, while normally sufficiently stable to be stored under normal storage conditions, are readily polymerizable by normal addition polymerization techniques to produce linear types of soluble polymers which can subsequently be insolubilized by heating in the presence of an acidic catalyst.

The present method which involves the introduction of alkoxymethyl groups into the monomeric compounds is distinctly advantageous over procedures of producing polymers of compounds having the structure of Formula V:

(V)

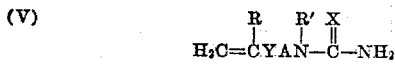

and then attempting to form alkoxymethyl derivatives thereof. While the polymers are less subject to hydrolysis than the monomers in the case of the ethers and the sulfides on the acid side as well as in the case of the esters in the alkaline side, it is more difficult to control the extent of entry of the alkoxymethyl groups into the polymer and the distribution of such groups therein. In the case of the thioureas, the sulfur of the urea group is still as readily, or in some cases more readily, attacked than the nitrogen atoms with consequent modification of the polymeric product to form undesired components. In addition, the presence of the alkoxymethyl group in the polymers obtained simply by addition polymerization of the compounds of Formula I of the present invention saves the necessity of subsequently reacting the polymers, such as those obtained by the addition polymerization of the compounds of Formula V with formaldehyde and alcohols, which is extremely undesirable in the case of polymers which are in shaped form such as in the form of coatings, casting, moldings or extruded products.

The monomeric compounds of the present invention are useful as bactericides and fungicides. They may also be used to form linear polymers including homopolymers and copolymers by simple addition polymerization.

The polymerization of the monomeric ether and sulfide types of the new compounds is effected in the presence of an acyclic azo compound. In such compound the —N=N— group is attached to aliphatic carbon atoms, at least one of which is tertiary. Typical azo catalysts are azodiisobutyronitrile, azodiisobutyramide, dimethyl (or diethyl or dibutyl) azodiisobutyrate, azobis (α,γ-dimethylvaleronitrile), azobis(α-methylbutyronitrile), azobis(α-methylvaleronitrile), dimethyl azobismethylvalerate, and the like. In these catalysts one of the carbons bonded to the tertiary carbon atom has its remaining valences satisfied by at least one element from the class consisting of oxygen and nitrogen. Polymerization of the ester type of the new monomeric compounds may be effected by any of the azo types of initiators above or by other free radical types of initiators, such as butyl perbenzoate, benzoyl peroxide, lauroyl peroxide, acetyl peroxide, or alkali metal persulfates, such as ammonium persulfate, optionally in conjunction with reducing agents, such as sodium hydrosulfite and the like.

To effect polymerization the vinyl ethers or sulfides and the acyclic azo catalyst are mixed directly or in the presence of an inert solvent and the mixture is maintained between 60° and 100° C. until the desired extent of polymerization is attained. For water-soluble monomers water may serve as solvent, if desired. Other solvents include methanol, ethanol, isopropanol, butanol, dimethylformamide, benzene, toluene, ethyl acetate, etc. The amount of catalyst may be varied from about 0.1% to about 5% of the weight of the monomer or monomers. The polymerization is best carried out in an inert atmosphere such as nitrogen gas.

For polymerization in solution concentrations of monomer from about 10% to about 60% are generally desirable. The course of polymerization may be readily followed from the increase in viscosity of the solution. The catalyst or initiator may be added in increments, if desired, with or without additional solvent.

For bulk polymerization the preferred temperatures are from about 70° to about 80° C. and the optimum proportion of catalyst is from 0.3% to 1% of the weight of the monomer weight. Under a nitrogen atmosphere a satisfactory degree of polymerization is obtained in 10 to 20 hours.

The polymers which result are soluble substances unless diethylenically unsaturated comonomers are used.

With increase in the size of the groups A, R' and R³, the polymers change from water-soluble to solvent-soluble. Thus with increase in size of such groups, the polymer becomes soluble in alcohols or benzene.

The polymers of this invention are classed as high polymers since the polymers are built up of a large number of repeating units. Yet it must be pointed out that the degree of polymerization can readily be controlled by choice of solvent and other conditions of polymerization. Polymers of 10,000 to 200,000 or higher molecular weight may be obtained.

In contrast to alkyl vinyl ethers which copolymerize under the influence of organic peroxides but poorly and in some cases fail to enter into copolymers, the vinyl ethers and sulfides of the invention have been found widely useful in copolymerizations. It has been found that these ethers can be copolymerized with other polymerizable olefinically unsaturated compounds, particularly vinylidene compounds, under the influence of a polymerization catalyst or initiator of the free radical type, such as peroxides or azo catalysts, an acyclic azo compound being particularly useful and advantageous. With an azo catalyst temperatures between 50° and about 100° C. are generally effective for copolymerizing. Somewhat higher temperatures are useful when catalysts of the peroxidic type are used, temperatures between 75° and 150° C. being practical, the above temperatures being those observed for copolymerization in bulk or in solution. Temperatures between 0° and 100° C. or more are useful when copolymerization is carried out in aqueous suspensions or in emulsions.

The same azo catalysts described above for use in forming polymers are used for preparing copolymers, particularly when the major portion of the monomers is a vinyl ether or sulfide of the invention. The amount of catalyst may be varied between 0.1% and 5% of the weight of the monomers to be copolymerized. A range from 0.3% to 1% is preferred, at least at the start. Small amounts of catalyst may be added from time to time as copolymerization proceeds.

When a monomeric ester of the invention is homopolymerized or copolymerized or when a vinyl ether or sulfide of the invention furnishes the minor portion of an interpolymer, however, other free radical catalysts may prove as desirable as azo catalysts. For example, the above-mentioned organic peroxides, such as butyl perbenzoate, or benzoyl peroxide, are suitable for polymerization in bulk or in solution, while ammonium persulfate and the like are useful in the polymerization of dispersions.

As useful unsaturated compounds for forming the copolymers there may be used esters of acrylic acid or methacrylic acid and monohydric alcohols such as methyl, ethyl, butyl, octyl, dodecyl, cyclohexyl, allyl, methallyl, undecenyl, cyanoethyl, dimethylaminoethyl, and the like; esters of itaconic acid and similar alcohols; esters from maleic, fumaric, or citraconic acids, and likewise similar alcohols; vinyl esters of carboxylic acids such as acetic, propionic, butyric, and the like; vinyloxyalkyl esters such as vinyloxyethyl acetate, etc.; vinyl ethers such as ethyl vinyl ether, butyl vinyl ether, octyl vinyl ether, allyl vinyl ether, hydroxyethyl vinyl ether, aminoethyl vinyl ether, aminopropyl vinyl ether, dimethylaminoethyl vinyl ether, vinyloxyethoxyethanol, vinyloxypropoxyethanol; methacrylonitrile or acrylonitrile; acrylamide, or methacrylamide, and N-substituted amides of these types; vinyl chloride, vinyl bromide, vinylidene chloride, 1-chloro-1-fluoroethylene, or ethylene; 1-acetoxy-1,3-butadiene; styrene, 2-vinylpyridine, 4-vinylpyridine, N-vinylpyrrolidone, formamidoethyl vinyl ether, or divinylbenzene; ethylene diacrylate or dimethacrylate, bis-(vinoxyethyl)urea, vinoxyethyl acrylate, vinoxypropyl acrylate, etc. Where two polymerizable vinylidene groups occur in the same molecule, as in compounds toward the end of the above list, crosslinking results where more than one to two percent thereof is used in forming the copolymer.

There are several important type of classes of interpolymers which should be particularly mentioned. Where it is desired to obtain new properties or variations in properties over the properties of the homopolymer of a ureido or thioureido compound of the invention, there may be used about 1% to about 60% of one or more other polymerizable monoethylenically unsaturated or vinylidene componds. Often 1% to 20% of the monomers of the present invention is the most useful range to promote the desired modification of properties of other polymeric types. Some valuable examples of copolymers of this sort are those obtained with 1% to 20% of methoxymethylureidoethyl vinyl sulfide and 99% to 80% of acrylamide or N-methyl acrylamide which have water-solubility and are also soluble in organic solvents, such as methanol, or in aqueous-organic solvent systems, such as aqueous methanol or aqueous acetone. These copolymers have marked affinity for cellulose, such as rayon fabrics on which they may be applied and cured to control shrinkage thereof.

Copolymerization, as has been indicated, may be effected in bulk, in solution, or in dispersion. When the monomers to be copolymerized are water-soluble, they may be copolymerized in aqueous solutions. Solvent-solube monomers may be handled in inert organic solvents such as benzene, toluene, methanol, ethanol, butanol, acetone, methyl ethyl ketone, dimethylformamide, ethyl acetate, ethylene dichloride, etc. Concentrations from about 10% to 60% are conveniently used. The course of copolymerization may be followed from the changes in viscosity or changes in solubility. Monomers and copolymer may be separated, if desired, by precipitation, extraction, distillation, or other conventional step.

Polymerization may also be carried out by techniques useful for forming copolymers in dispersion in aqueous systems. Here a mixture of a monomer of the invention and another polymerizable monoethylenically unsaturated compound without or with an inorganic solvent is dispersed or suspended in water. An emulsifier and/or dispersing agent may be used. The mixture is usually stirred. A polymerization catalyst is added, or catalyst and activator and, if desired, modifiers, such as buffers, metal ions, mercaptans, and the like. Ordinarily dispersions containing 10% to 60% of polymerizable materials are used. Temperatures from below 0° C. to about 100° C. may be used. The preferred temperature range is 15° to 60° C.

The polymers are adapted to be dissolved in a suitable solvent containing an acidic catalyst and to then be applied for various purposes to paper, leather, textiles, wood, metal, glass, plastics and so on as coatings, adhesives, or impregnants which can then be dried and directly converted to insoluble and infusible condition by simply heating. The catalysts used may be ammonium phosphate, ammonium thiocyanate, hydrochloric or other acid salts of a hydroxy aliphatic amine including 2-methyl-2-amino-1 - propanol, 2 - methyl - 2-amino-1,3-propandiol, tris(hydroxy-methyl)-aminomethane, 2 - phenyl-2-amino-1 - propanol, 2 - methyl - 2 - amino - 1 - pentanol, 2-aminobutanol, triethanolamine, 2-amino-2-ethyl-1-butanol, also ammonium chloride, pyridine hydrochloride, benzyldimethylamine oxalate. The amine salts are water-soluble latent catalysts substantially neutral at ordinary temperature but dissociate into volatile components one of which is acidic at the elevated temperatures used for baking and curing, so that the catalyst after exerting its accelerating effect is automatically discharged during the heating or curing stage.

The heat convertible polymers thus applied and converted to insoluble and infusible condition modify the properties and particularly the surface properties of the coated or impregnated substrate. This modification may simply involve the provision of a protective and/or decorative finish or coating on the treated substrate. In the case of paper, the polymers and copolymers containing from 1 to 20 mole percent of units having the structure of Formula I serve to impart wet strength thereto. The polymers applied for this purpose may simply be incorporated in the pulp, at the beater, or as it proceeds to the wire of the paper-making machine. The polymers may be applied to wool and rayon or cotton fabrics for the purpose of reducing water-sensitivity and stabilizing the fabrics thereof against shrinkage on laundering. They may also be applied to cotton and rayon fabrics for crush-proofing and crease-proofing. Water-repellency may be imparted to leather and textile fabrics, especially cottons and rayons when the polymers contain hydrophobic groups, such as long-chain R' groups having 8 to 12 carbon atoms or hydrophobic groups in comonomers such as copolymers containing comonomers of higher alcohol esters of acrylic or methacrylic acid, such as lauryl methacrylate.

The homopolymers and copolymers of the present invention may be used to form films, sheets, rods, tubes, and other shaped articles by casting, molding, or extrusion of either fused masses of the polymers or of solutions thereof in suitable solvents, especially organic solvents such as dimethylformamide and acetone.

The compositions containing the homopolymers and copolymers of the present invention dissolved or suspended in suitable media, such as water or organic solvents, may be dyed, pigmented, or provided with extenders, fillers, or the like, and may be combined with other film-forming or coating resins, such as aminoplasts, including urea-formaldehyde or melamine-formaldehyde resins, alkyds or vinyl polymers. Such compositions may be applied to all sorts of substrates and subsequently converted by heating to a baked enamel finish, as on porcelain, metals, and so on. Pigments, such as titanium dioxide, lithopone, barium sulfate, ultramarine blue, may be used for this purpose.

In the following examples, the parts are by weight unless otherwise specifically indicated, and generally the abbreviation "m." is used to designate "moles":

Example 1

A solution of 43.5 grams (0.5 m.) of 2-aminoethyl vinyl ether in 250 ml. of ether is stirred, cooled, and treated slowly with 65.0 grams (0.5 ml) of butoxymethyl isocyanate. The addition is completed in 30 minutes and stirring is continued for an additional 15 minutes during which time crystallization of the product occurs. The product, isolated by filtration is recrystallized from 500 ml. of ether to give an essentially quantitative yield, 100 grams, of pure material, M. P. 65°–66° C. The product contains 13.0% N, agreeing with the theoretical value of 13.0% N for N-(2-vinyloxyethyl)-N'-n-butoxymethylurea, $CH_2=CHOCH_2CH_2NHCONHCH_2OC_4H_9$-n.

The product is useful as an additive to aminoplast resins. For example, a condensate is prepared in the usual manner from urea, formaldehyde and butanol in a molar ratio of 1/2.2/2.0 as a 50% solution in butanol-xylene (1:1) with a Gardner-Holdt viscosity of W–Z. To 100 parts of this solution is added 20 parts of the product of Example 1 and 0.3% of butyl acid phthalate. The material is then formed into a film and baked at 250° F. for 30 minutes. The resultant film shows improved flexibility and tensile properties over the unmodified butylated methylol urea resin.

Example 2

To a solution of 8.7 grams (0.1 m.) of methoxymethyl isocyanate in 30 ml. of benzene, there is added dropwise at 7° C. with concomitant stirring 18.5 grams (0.1 m.) of t-butylaminoethyl methacrylate in 50 ml. of benzene in a period of 30 minutes. The product, a colorless oil, is obtained on removal of solvent and unreacted material by stripping at a pressure of 0.1 mm. Hg. The product, 26 grams, contains 10.0% nitrogen and corresponds to N-methoxymethyl-N'-t-butyl-N'-methacrylatoethylurea $$CH_2=C(CH_3)COOCH_2CH_2-$$
$$N(C_4H_9\text{-}t)CONHCH_2OCH_3$$

which has a theoretical content of 10.3% N.

The product is useful in the surface modification of reactive materials such as leather, glass, wood, cotton, nylon, rayon, and the like. A solution of this methacrylate in methanol, ethanol, butanol, or the like, containing 5% of butyl acid phthalate (or butyl phosphoric acid), is applied to the desired substrate and the material is dried at 220° F. for 10 minutes. The surface is now receptive to further reaction with amines such as lauryl amine to impart basic character and hydrophobicity or with resins such as maleic polyesters in styrene solution to give good bond between resin and substrate.

Example 3

A solution of 15.3 grams (0.175 m.) of 2-aminoethyl vinyl ether in 20 ml. of benzene is added to a stirred, cooled solution of 11 grams (0.155 m.) of methoxymethyl isocyanate in 30 ml. of benzene at such a rate as to control the exotherm. The product, N-(2-vinyloxyethyl)-N'-methoxymethylurea, is isolated as a low-melting solid by stripping at 0.5 mm. Hg. The product is soluble in cold water, ethylene dichloride, and benzene. It is insoluble in ether or petroleum ether. It dissolves in hot ethyl acetate and precipitates on cooling.

The product is useful alone or for the modification of nitrogen resins for the treatment of textile materials. For example, a mixture of a 10% aqueous solution containing 40 parts of dimethylol urea, 10 parts of the product prepared as described in the preceding paragraph and 0.5 part of ethanolamine hydrochloride is used to treat rayon challis by padding so as to give a retention of 2% resin solids. The fabric is dried and cured at 220° F. for 10 minutes and is thereby effectively rendered crease-proof and shrink-proof with little change in hand.

Example 4

(a) By the procedure of Example 1 there is condensed 51 grams of 2-(N-methylamino)ethyl vinyl ether and 51 grams of ethoxymethyl isocyanate to give a quantitative yield of N-vinyloxyethyl-N-methyl-N'-ethoxymethylurea. The product is isolated as an oil that is soluble readily in organic solvents such as alcohol, benzene, and ethyl acetate.

(b) Similarly, the reaction of 23 grams of 2-(N-methylamino)ethyl vinyl sulfide and 23 grams of n-propoxymethyl isocyanate gives $$CH_2=CHSCH_2CH_2N(CH_3)CONHCH_2OC_3H_7\text{-}n$$

N-methyl-N-vinylthioethyl-N'-n-propoxymethylurea as a yellow oil. This material is useful as a pesticide, particularly as a contact insecticide for the control of aphids.

(c) A mixture of 11.5 grams of i-propoxymethyl isocyanate and 14.3 grams of 2-(N-butylamino)isopropyl vinyl ether reacted by the procedure of Example 1 gives $$CH_2=CHOCH(CH_3)-CH_2-$$
$$N(C_4H_9\text{-}n)CONHCH_2OC_3H_7\text{-}i$$

as a high boiling, light yellow oil.

(d) A mixture of 51.0 grams of 2-(N-dodecylamino)-ethyl vinyl ether and 26.0 grams of i-butoxymethyl isocyanate in chloroform is allowed to condense at 25°–40° C. for 6 hours. The product is a low-melting, waxy solid. It is useful as a durable softening agent and water-repellent for textiles. Cotton twill is immersed in a chloroform solution containing 8% of the product and 0.1% of p-toluenesulfonic acid, the application conditions being such that a resin pickup of 4 to 5% is obtained. The fabric is dried and cured at 300° F. for 5 minutes and is thereby rendered resistant to wetting and possesses a full, soft hand. These properties are retained substantially unchanged after washing and dry cleaning.

Example 5

A solution of 28.0 grams (0.34 m.) of 2-aminoethyl vinyl ether in 100 ml. of benzene is added to 33.0 grams (0.32 m.) of methoxymethyl isothiocyanate in benzene for 15 minutes at 0° to 35° C. The reaction mixture solidified at 0° to 5° C. and the solid is collected to give 51 grams (84% yield) of material, M. P. 68° to 72° C. Recrystallization from ether gives pure material, M. P. 75° to 76° C. as white, acicular crystals containing 14.6% N and 17.2% S. The theoretical values for N-methoxymethyl-N'-vinyloxyethylthiourea, $$CH_2=CHOCH_2CH_2NHCSNHCH_2OCH_3$$

are 14.8% N and 16.9% S.

The product is useful as a bactericidal and fungicidal agent controlling Monilinia fructicola and Stemphylium sarcinaeforme organisms and giving at least a 10 mm. zone of inhibition when tested against Micrococcus pyogenus var. aureus.

Example 6

The procedure of Example 5 is employed with 14 grams of 2-aminoethyl vinyl ether and 22.0 grams of n-butoxymethyl isothiocyanate. The product, 37 grams, is obtained as a clear, red oil containing 11.5 N and 13.8% S, thus corresponding to $$CH_2=CH-O-CH_2CH_2NHCSNHCH_2OC_4H_9$$

The product is a bactericide having a phenol coefficient of 2.2 against S. typhosa and a 12 mm. zone of inhibition against Micrococcus pyrogenus var. aureus.

Example 7

A condensation of 26 grams of methoxymethyl isothiocyanate and 38 grams of 2-aminophenyl vinyl sulfide is effected in 200 ml. of ether at 0° to 15° C. The product, 61 grams, is isolated as a white solid, M. P. 88° to 94° C. Recrystallization from anhydrous ethanol gives an 82.5% yield of pure material, M. P. 97° to 98° C. containing 10.5% N and 24.8% S corresponding to N-(2-vinylthiophenyl)-N'-methoxymethylthiourea,

[benzene ring]—S—CH=CH$_2$
              —NHCSNHCH$_2$OCH$_3$

This material is effective as a fungicide for the control of the Monilinia and Stemphylium organisms supra. It may be applied from solution or as a dust formulated with diluent clays.

*Example 8*

A similar condensation of 51 grams of 2-aminophenyl vinyl sulfide and 48.5 grams of butoxymethyl isothiocyanate in ether gives the product as a pale yellow solid which is recrystallized from ethanol. It corresponds to N-(2-vinylthiophenyl)-N'-butoxymethylthiourea,

[benzene ring]—S—CH=CH$_2$
              —NHCSNHCH$_2$OC$_4$H$_9$

This material is an effective fungicide. The product contains by analysis 9.3% N and 21.7% S. The theoretical values are 9.43% N and 21.6% S.

*Example 9*

To a solution of 10.3 grams of methoxymethyl isothiocyanate in 30 ml. of benzene there is added dropwise a solution of 18.5 grams of t-butylaminoethyl methacrylate in 50 ml. of benzene. The product, N-t-butyl-N-methacrylatoethyl-N'-methoxymethylthiourea, $CH_2$=C(CH$_3$)COOCH$_2$CH$_2$N(t-C$_4$H$_9$)CSNHCH$_2$OCH$_3$ is isolated by stripping at reduced pressure (0.1 to 0.2 mm. Hg) as a yellow oil containing 10.3% N and 11.8% S.

The product is a bactericide giving a 20 mm. zone of inhibition against *Micrococcus pyogenus* var. *aureus* and phenol coefficients of 1.2 and 1.5 against *S. typhosa* and *M. pyogenus* var. *aureus* respectively.

The product is useful for the modification of such materials as textiles, wood, cellulosic materials, wool, leather, and the like. The product is applied from a 5% to 15% solution containing 0.05 to 0.3% of an acid catalyst such as butyl phosphoric acid or ammonium chloride and the treated material dried and cured at 150° to 250° F. for 2 to 10 minutes. The treated materials are much less hydrophilic and contain a layer of methacrylate groups useful as anchoring sites for further treatment. Thus such treated materials may be further reacted with amines such as laurylamine to render the surface basic and hydrophobic.

*Example 10*

A mixture of 21.0 grams (0.1 m.) of N-methyl-N-vinyloxyethyl melamine and 20.6 grams of methoxymethyl isothiocyanate in 200 ml. of dry acetone is heated at 60° to 65° C. for 16 hours. A yellow solid precipitates during the reaction. The mixture is cooled and the solid is collected and dried to give 30 grams of product, N-methyl-N-vinyloxyethyl-N'-methoxymethylthiocarbamidomelamine, having the structure of CH$_2$=CHOCH$_2$CH$_2$N(CH$_3$)—C(=N)—N=C(NH$_2$)—N=C(NHCNHCH$_2$OCH$_3$)
                                                           ‖
                                                           S containing 32.3% N and 11.6% S. The product is soluble in dimethylformamide and insoluble in water.

*Example 11*

A solution of 43 grams of 2-aminoethyl vinyl ether is added to 69 grams of 1,6-(bis-isothiocyanomethoxy)-2,5-dimethylhexane in acetone at 0° to 5° C. The mixture is allowed to stand at 25° to 30° C. for 16 hours and then the product is isolated by stripping. Purification is effected by recrystallization from alcohol to yield 18 grams of the product, 2,5-dimethyl-1,6-bis-(vinyloxyethylthioureidomethoxy)hexane having the structure (CH$_2$=CH—O—CH$_2$CH$_2$NHCSNHCH$_2$O—
                              CH$_2$—CH(CH$_3$)—CH$_2$—)$_2$ It is a tan solid, M. P. 94° to 95° C., containing 11.8% N and 13.9% S.

The product is useful as a fungicide controlling both *Monilinia fructicola* and *Stemphylium sarcinaeforme*.

*Example 12*

A condensation is effected between 31 grams of N-cyclohexylaminoethyl vinyl ether and 20.2 grams of ethoxymethyl isothiocyanate in dry acetone to give a quantitative yield of product, N-cyclohexyl-N-vinyloxyethyl-N'-ethoxymethylthiourea,

CH$_2$=CHO—CH$_2$CH$_2$—N(C$_6$H$_{11}$)CSNHCH$_2$OC$_2$H$_5$ (where C$_6$H$_{11}$ is a cyclohexyl radical).

The product is useful as a fungicide.

*Example 13*

A condensation of 14.5 grams of 3-(N-ethylamino)-propyl vinyl sulfide and 11.5 grams of propoxymethyl isothiocyanate is effected in dry acetone to give N-ethyl-N-3(vinylthio)propyl-N'-propoxymethylthiourea, CH$_2$=CHS(CH$_2$)$_3$N(C$_2$H$_5$)CSNHCH$_2$OC$_3$H$_7$—n

*Example 14*

A solution of 25.5 grams of lauroxymethylisocyanate in benzene is added to 11.5 grams of 3-aminopropyl vinyl ether to give N-vinyloxypropyl-N'-lauroxymethyl urea as a waxy solid. This product is useful as a lubricant for the spinning of textile fibers such as cotton or rayon and synthetic fibers such as polyamides or polyesters like nylon or Dacron (polyethylene glycol terephthalate).

*Example 15*

A solution of 25 grams of N-vinyloxyethyl-N'-methoxymethylurea, the product of Example 3, 25 grams of water adjusted to pH 7.0 and 0.5 gram of dimethyl azoisobutyrate is heated in a flask with stirring at 75° C. for 16 hours in a nitrogen atmosphere. The viscosity increases with time to give a solution of poly(vinyloxyethylmethoxymethylurea).

This material is useful as a tire-cord adhesive for improving the strength of the bond between rayon cord and tire-carcass rubber. Tire cord is sized with a rubber latex containing 10% by weight of rubber of the polymer of this example and the cords are dried and cured at 220° F. for 30 minutes. The cords are then incorporated into a styrene-butadiene rubber of the GR-S type and an H-type specimen is prepared. Tensile tests of the specimen to failure indicate a two-fold increase in adhesion of treated cord to rubber as compared to cord sized with unmodified latex.

The polymer is useful also as a beater additive for improving the wet-strength of paper and as an additive to fiber and film dopes of cellulose acetate and other regenerative solution polymers for imparting decreased water pickup and improved tensile properties.

Example 16

A mixture of 50 grams of N-vinyloxyethyl-N'-butoxymethylurea, the product of Example 1, 50 grams of dimethylformamide, and 1.0 gram of dimethyl azoisobutyrate is heated at 75° C. for 8 hours to give a 90% conversion to polymer. Polymer is isolated by precipitation with water and dried.

A solution of the polymer in butanol containing 0.25% of butyl acid phthalate is cast as a film on glass and on metal plates, air-dried and then baked at 300° F. for 30 minutes. The resultant coatings are hard, show good adhesion and are solvent-resistant. The polymer is also useful as an additive to modify other coating resins such as those derived from urea or melamine.

Example 17

By the procedure of Example 16 there is prepared a polymer of the compound prepared as described in Example 4(b). Films are prepared on glass and metal by casting 5-mil wet films and baking for 30 minutes at 300° F. The films are tough but are thermoplastic. The process is repeated but the solution is catalyzed before filming with 0.2% of butyl phosphoric acid. The cured films are tough, clear, solvent and print-resistant with good adhesion to glass and metal.

Example 18

(a) A mixture of 6 grams of N-2-vinylthiophenyl-N'-methoxymethylthiourea, 2 grams of dimethylformamide, and 0.06 gram of dimethyl azoisobutyrate is heated at 75° C. for 16 hours. The resultant polymer is insoluble in water, dimethylformamide, acetone, and xylene.

(b) The monomer of part (a) may be mixed with dimethyl azoisobutyrate and polymerized in a heated mold to form a casting.

(c) Similarly a mixture of 6 grams of the same monomer prepared in Example 7, 0.4 gram of methyl methacrylate, 0.1 gram of dimethyl azoisobutyrate, and 10 grams of toluene gives an insoluble polymer at 75° C. in 16 hours.

Example 19

A polymer is prepared from the product of Example 2 by heating a 40% solution of the monomer in butanol in the presence of 0.5% of benzoyl peroxide at 100° C. for 6 hours. The resultant polymer solution is useful for the preparation of coatings for leather, ceramic tile, metal, fabrics and the like. Preferably 0.5% of butyl phosphoric acid is included and cure is accomplished by baking at 250° F. or 1 hour or 300° F. for 30 minutes.

Example 20

By the procedure of Example 19, the compound prepared in Example 9 is converted to a polymer. The polymer solution is useful in the preparation of coatings for metal or plastics as described in Example 19. The polymer is also useful as a preservative and pesticide and may be applied to leather, textiles or plants from solution or as an emulsion or dust.

Example 21

By the procedure of Example 16, a homopolymer of the product of Example 5 is prepared. The 50% polymer solution is transformed into an aqueous dispersion by adding to 5 volumes of water containing 1% of an ammonium salt of a styrene-maleic copolymer (based on weight of homopolymer) with good stirring. The resulting opalescent suspension is effective in the treatment of fabrics, wood, and cellulosic materials to prevent decay caused by fungi or bacteria.

Example 22

A solution of 90 grams of methyl methacrylate, 21.6 grams of the product of Example 1, 150 grams of ethoxyethyl acetate, and 0.5 gram of azoisobutyronitrile is added in a 2-hour period with stirring to a vessel maintained at 80° to 85° C. The resultant solution is treated with two 0.25 gram increments of the azonitrile at 2 hour intervals. The final colorless solution has a Gardner-Holdt viscosity of W at 39.6% solids.

Films applied to metal and baked at 300° F. for 30 minutes are clear, colorless and hard. These films are still soluble in ethoxyethyl acetate. Repeating the process with solution containing 0.5% of p-toluenesulfonic acid gives clear, hard films insoluble in all common organic solvents.

Example 23

The procedure of Example 22 is followed but the charge consists of 60 grams of butyl methacrylate, 30 grams of methyl methacrylate and 20 grams of the product of Example 4(b). The resultant resin solution has a light yellow color and a Gardner-Holdt viscosity of X. The product is useful as a coating material for baking enamels. It may be pigmented with an equal weight of titania pigment to resin solids to give after baking glossy, white, hard coatings suitable for appliance finishes.

Example 24

A mixture of 522 grams of methyl methacrylate, 428 grams of ethyl acrylate, 95 grams of N-methoxymethyl-N'-vinyloxyethylthiourea, 1280 grams of xylene and 10.5 grams of azoisobutyronitrile is added with stirring to a preheated pot maintained at 80° to 85° C. The mixture is treated twice at two hour intervals with 1.0 gram of the azonitrile; the entire polymerization requiring five hours. The product has a Gardner-Holdt viscosity of W— at 39.3% solids.

Films are prepared from the polymer solution alone and from polymer solution containing 1% by weight on resin solids of butyl acid phthalate. Ten-mil wet films are cast on glass and metal and baked at 150° C. for 30 minutes. Catalyzed and uncatalyzed resin both gave clear films with good adhesion to metal and glass. The acid catalyzed films show improved surface and improved film length.

Example 25

Heating a mixture of 95 grams of methyl methacrylate, 13.6 grams of the product of Example 2, 132 grams of ethoxyethyl acetate, and 2.2 grams of azoisobutyronitrile at 80° to 90° C. for 5 hours gives a resin with a Gardner-Holdt viscosity of Z-1+ at 40.4% solids. Films are cast from this solution alone, from the solution containing 1% of p-toluenesulfonic acid based on resin solids, and also from the solution modified with 1% of butyl acid phthalate. The films, baked at 150° C. for 30 minutes, all have good color and fair adhesion with excellent hardness. All exhibit a moderate degree of solvent-resistance.

Example 26

A mixture of acrylonitrile (70 parts), ethyl acrylate (25 parts) and the compound of Example 6 (5 parts) is emulsified with 180 parts of water and 5 parts of soap, all parts being by weight. To the emulsion is added 1 part of potassium chloride, 0.2 part of tetraethylenepentamine and 0.3 part of diisopropylbenzene hydroperoxide. The exothermic reaction is allowed to proceed to 60° C. with occasional moderation. A high conversion to stable polymer emulsion is obtained. The polymer is useful in the preparation of fibers and films which can be thermoset. Thus a polymer initially more readily processed than a homopolymer of acrylonitrile is obtained which can be subsequently converted to material equal to or better than polyacrylonitrile in tensile, retraction and resistance properties. The particular copolymer herein prepared also exhibits better dyeing properties than polyacrylonitrile.

Example 27

An emulsion polymer of 90 parts of butyl acrylate and 10 parts of the product of Example 1 (N-butoxymethyl-N'-vinyloxyethylurea) is prepared at 40% solids as described in Example 26. The resultant polymer is useful in the treatment of wool. Thus woolen fabric is padded through the emulsion so as to give 5% to 7% polymer retention. The fabric is then dried and cured briefly at 250° F. for five minutes. The treated fabric shows 5% to 10% total shrinkage after 300 minutes of laundering as compared to 45% to 50% shrinkage for untreated fabric. The fabric retains its initial soft hand and drapability.

Example 28

A solution of 5 grams of the product of Example 2, N - methoxymethyl - N' - t - butyl - N' - methacryloxyethylurea, in 95 grams of methyl methacrylate containing 0.01 gram of benzoyl peroxide is cast between sheets of polished plate glass at 65° to 90° C. for 24 hours. The resultant cast sheet is clear, transparent and of good color. The process is repeated except that the casting mixture contains 0.1% butyl acid phthalate. Again the sheet is clear and of good color. Both sheets are formed and then heated at 150° C. for 10 minutes. Both sheets are now more resistant to thermal deformation than unmodified poly(methyl methacrylate) sheet. The sheet containing acid shows the greatest improvement in this property.

Example 29

A copolymer of 95 parts of ethyl methacrylate and 5 parts of the product of Example 9 is prepared in ethoxyethyl acetate by the procedure of Example 22. The resultant polymer solution gives tough, flexible films which are thermoset on baking in the presence of butyl acid phthalate at 300° F. for 30 minutes.

It is to be understood that changes and variations may be made without departing from the spirit and scope of the invention as defined in the appended claims.

I claim:

1. As a composition of matter, N-methoxymethyl-N'-t-butyl-N'-methacrylatoethylurea.
2. As a composition of matter, a polymer of N-methoxymethyl-N'-t-butyl-N'-methacrylatoethylurea.
3. As a composition of matter, a copolymer of N-methoxymethyl-N'-t-butyl-N'-methacrylatoethylurea with an ester of acrylic acid.
4. As a composition of matter, a compound of the formula $$H_2C=C(CH_3)COOAN(R')CONHCH_2OR^2$$

where A is an alkylene group having 2 to 4 carbon atoms of which a chain of at least two extend between the adjoined atoms of O and N, R' is an alkyl group of 4 to 12 carbon atoms containing a tertiary carbon atom attached to the adjoining N atom, and $R^2$ is a lower alkyl group having 1 to 4 carbon atoms.

5. A composition of matter comprising a polymer of a compound as defined in claim 4.
6. As a composition of matter, a compound of the formula

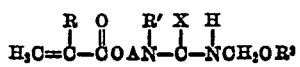

in which R is selected from the group consisting of H and $CH_3$, A is selected from the group consisting of phenylene and alkylene groups having 2 to 4 carbon atoms of which a chain of at least two extend between the adjoined atoms of O and N, R' is an alkyl group having 4 to 12 carbon atoms containing a tertiary carbon atom attached to the adjoining N atom, X is selected from the group consisting of O and S, and $R^2$ is a lower alkyl group having 1 to 4 carbon atoms.

7. A polymer of a compound of claim 6.
8. A copolymer of a compound of claim 6 with another copolymerizable ethylenically unsaturated compound.
9. A linear copolymer of a compound of claim 6 with another copolymerizable monoethylenically unsaturated compound.
10. A cross-linked copolymer of a compound of claim 6 with a copolymerizable diethylenically unsaturated compound.
11. A method comprising reacting a compound of the formula $$H_2C=C(R)COOANHR'$$

with a compound having the formula $$R^2OCH_2NCX$$

in which R is selected from the group consisting of H and $CH_3$, A is selected from the group consisting of phenylene and alkylene groups having 2 to 4 carbon atoms of which a chain of at least two extend between the adjoined atoms of O and N, R' is an alkyl group having 4 to 12 carbon atoms containing a tertiary carbon atom attached to the adjoining N atom, X is selected from the group consisting of O and S, and $R^2$ is a lower alkyl group having 1 to 4 carbon atoms, and recovering a compound of claim 6.

12. A method as defined in claim 11 in which the reaction is effected at a temperature of about 0° to 50° C.
13. A method which comprises the step of polymerizing at a temperature of about 60° to about 100° C. a compound of claim 6 by means of a free radical catalyst.
14. A method as defined in claim 13 in which the catalyst is an azo catalyst.
15. A method as defined in claim 13 in which polymerization with other comonomers is effected in the presence of a free radical catalyst selected from the group consisting of azo catalysts, organic peroxide catalysts including peroxides and perbenzoates, and inorganic persulfates.
16. As a composition of matter, a copolymer of N-methoxymethyl-N'-t-butyl-N'-methacrylatoethylurea with an ester of methacrylic acid.
17. As a composition of matter, N-t-butyl-N-methacrylatoethyl-N'-methoxymethylthiourea.
18. A polymer of the compound of claim 17.
19. A copolymer of the compound of claim 17 with an ester of methacrylic acid.

References Cited in the file of this patent

UNITED STATES PATENTS 2,689,844   Melamed _____ Sept. 21, 1954

OTHER REFERENCES

Saunders et al.: Chemical Reviews, vol. 43, pp. 203–218 (only 210 relied upon), 1948.